United States Patent [19]

Woess et al.

[11] Patent Number: 5,432,931
[45] Date of Patent: Jul. 11, 1995

[54] DIGITAL TELECOMMUNICATION SYSTEM WITH MULTIPLE DATABASES HAVING ASSURED DATA CONSISTENCY

[75] Inventors: Friedrich Woess, Otterfing; Luzia Stephan, Bergkirchen-Feldgeding, both of Germany

[73] Assignee: Siemens Aktiengesellschaft, Munich, Germany

[21] Appl. No.: 905,043

[22] Filed: Jun. 26, 1992

[30] Foreign Application Priority Data

Jun. 28, 1991 [EP] European Pat. Off. ........... 91110803

[51] Int. Cl.6 .............................................. G06F 15/40
[52] U.S. Cl. ..................................... 395/650; 395/325;
395/600; 364/DIG. 1; 364/282.1; 364/286.5;
364/284.1; 370/58.2; 340/825.06
[58] Field of Search .................... 395/650, 700, 600;
364/DIG. 1, 228.4, 228.6, 282.2

[56] References Cited

U.S. PATENT DOCUMENTS

| 4,442,321 | 4/1984 | Stehman | 179/18 EB |
|---|---|---|---|
| 4,713,806 | 12/1987 | Oberlander et al. | 370/58 |
| 4,763,317 | 8/1988 | Lehman et al. | 370/58 |
| 4,903,258 | 2/1990 | Kuhlmann et al. | |
| 4,956,772 | 9/1990 | Neches | 364/200 |
| 5,018,097 | 5/1991 | Kuhlmann et al. | 364/900 |
| 5,019,963 | 5/1991 | Alderson et al. | 364/200 |
| 5,047,923 | 9/1991 | Elstner et al. | |
| 5,089,954 | 2/1992 | Rago | 395/600 |
| 5,113,499 | 5/1992 | Ankney et al. | 395/325 |
| 5,212,789 | 5/1993 | Rago | 395/600 |

FOREIGN PATENT DOCUMENTS 0237841 9/1987 European Pat. Off. .

OTHER PUBLICATIONS

"Operating Software of the HICOM ISDN Communication System" by H. Thomas et al, pp. 92–103 (Telcom, Dec. 1985).
"Configurable Software for Advanced Telephony Applications", by M. K. Rugheimer et al, IEEE International Conf. on Comm. 1988, pp. 1312–1316.
"Database Management Strategies to Support Network Services", by D. Cohen et al, IEEE International Conference on Communications, 1984, pp. 734–736.

Primary Examiner—Kevin A. Kriess
Assistant Examiner—Majid Banankhah
Attorney, Agent, or Firm—Hill, Steadman & Simpson

[57] ABSTRACT

A digital telecommunication switching system having at least one master database and at least one dependent database in conjunction with administration and maintenance procedures. For assuring data consistency, administration and maintenance commands trigger the processing of administration and maintenance jobs AMO in a plurality of databases. The commands contain a designation of the respective administration and maintenance job, a designation of the action to be implemented, for example "modify", as well as parameter data that specify the program module AMO and the respective action. After the modification of a data set in the master database, the command is communicated unmodified to one or more dependent databases that extract the relevant data subset.

7 Claims, 5 Drawing Sheets

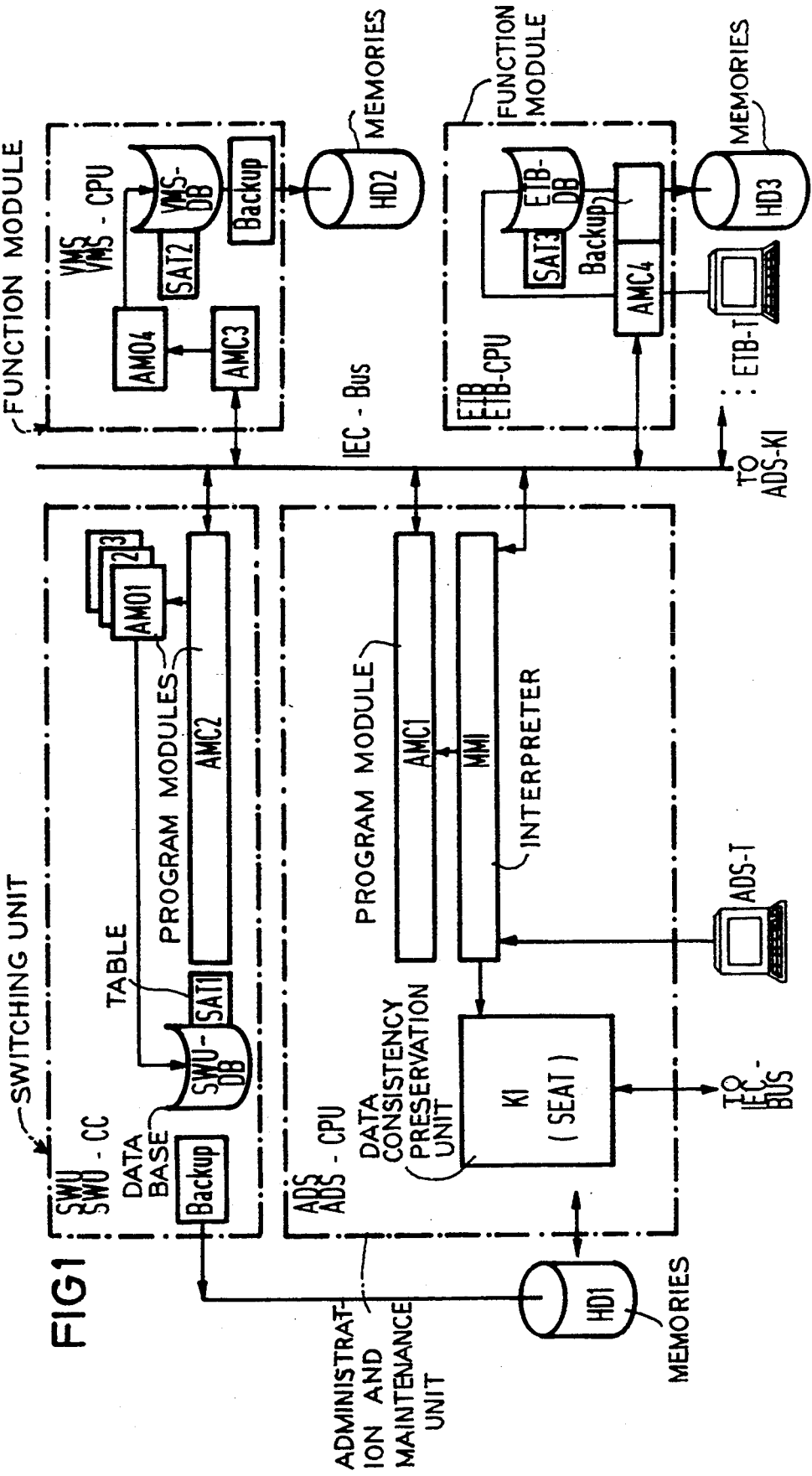

FIG 2a

| AMO \ DB | SWU-DB | | | VMS-DB | | | ETB-DB | | | ... |
|---|---|---|---|---|---|---|---|---|---|---|
| ABC  |   |   |     | x | M | 17  |   |   |     |   |
| SCSU | x | M | 108 |   |   |     | x |   | 108 |   |
| SBCSU| x | M | 24  |   |   |     | x |   | 24  |   |
| PERSI| x | M | 367 | x |   | 366 | x |   | 366 |   |

FIG 2b

| AMO \ DB | SWU-DB | | | JST | SOLL | VMS-DB | | | JST | SOLL | ETB-DB | | | JST | SOLL | ... |
|---|---|---|---|---|---|---|---|---|---|---|---|---|---|---|---|---|
| ABC  |   |   |     |     |     | x | M | 17  | 17  |     |   |   |     |     |     |   |
| SCSU | x | M | 108 | 108 |     |   |   |     |     |     | x |   | 108 | 108 |     |   |
| SBCSU| x | M | 24  | 25  |     |   |   |     |     |     | x |   | 24  | 24  |     |   |
| PERSI| x | M | 367 | 367 |     | x |   | 366 | 366 |     | x |   | 366 | 367 |     |   |

FIG 2c

SAT 1(SWU)

| SCSU<br>SBCSU<br>PERSI | 108<br>24<br>367 |

FIG 2d

SAT 2(VMS)

| ABC<br>PERSI | 17<br>366 | M |

FIG 2e

SAT 3(ETB)

| SCSU<br>SBCSU<br>PERSI | 108<br>24<br>366 |

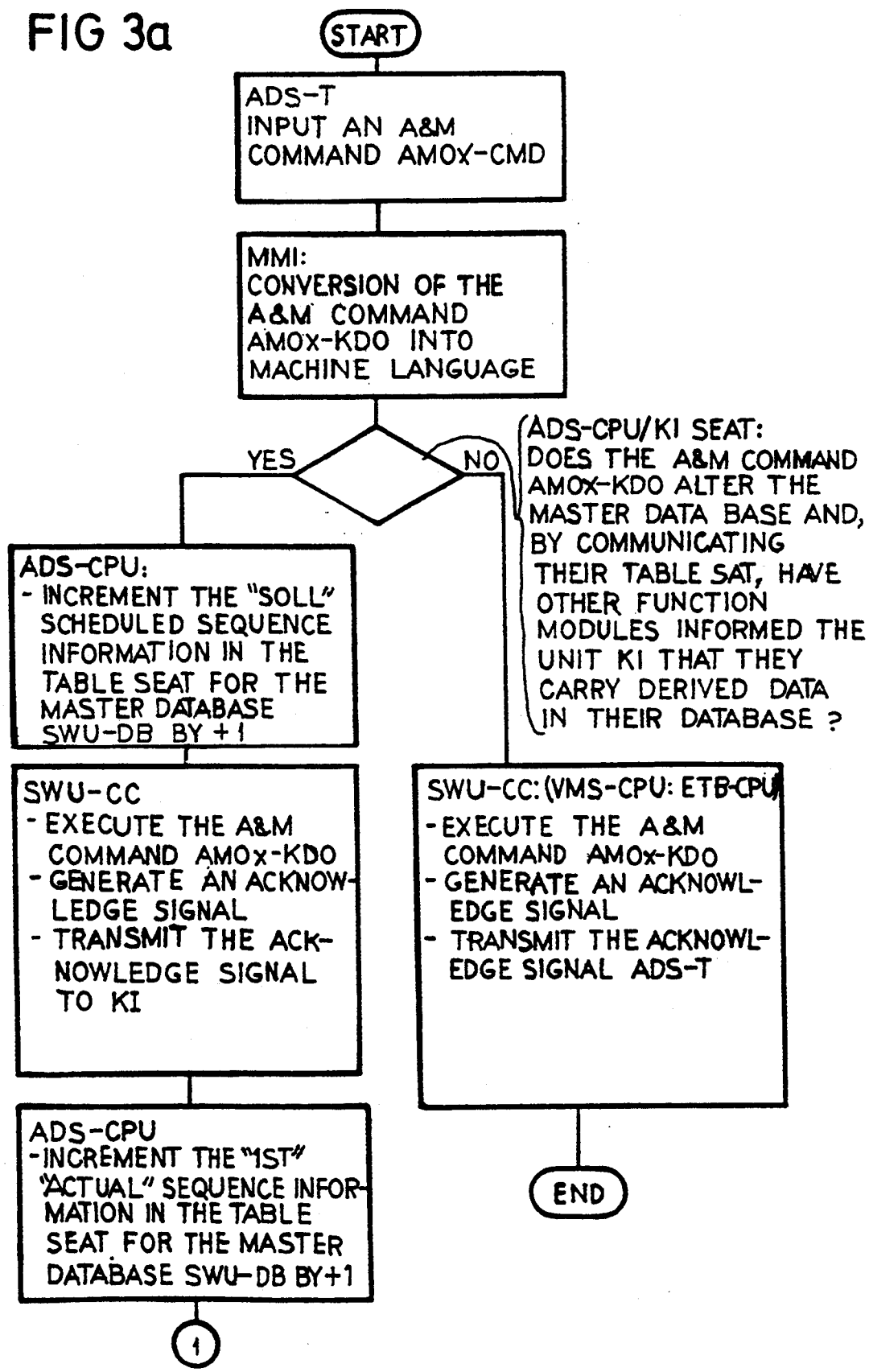

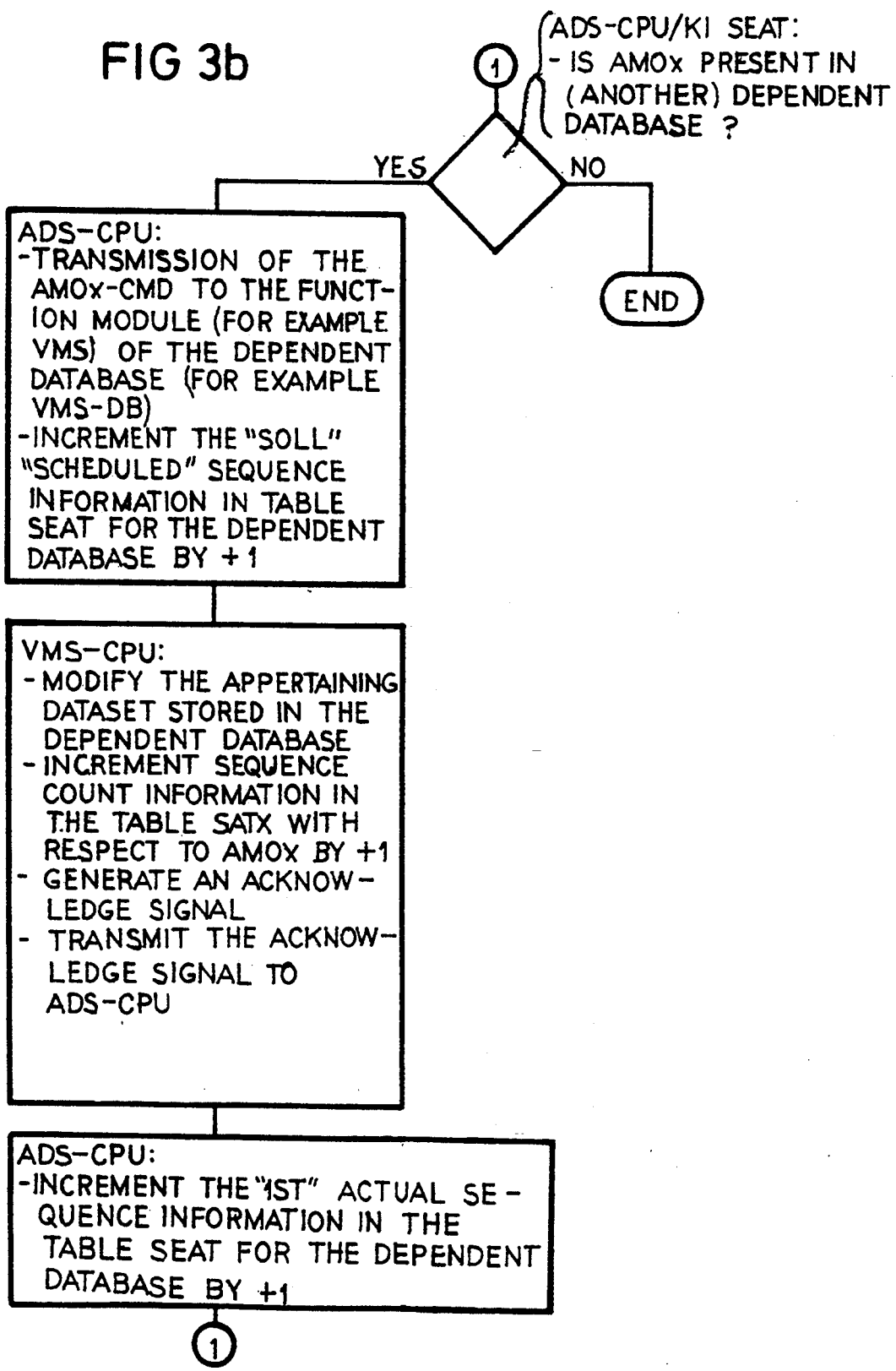

DIGITAL TELECOMMUNICATION SYSTEM WITH MULTIPLE DATABASES HAVING ASSURED DATA CONSISTENCY

BACKGROUND OF THE INVENTION

Digital telecommunication switching systems serve the purpose of connecting telecommunication terminal equipment having versatile performance features to one another and of connecting such terminal equipment to communication networks, particularly to public networks.

A publication of Siemens AG (Special Issue of telcom report, and Siemens Magazine COM, "ISDN in the Office", December 1985 Ordering No. A 19100-L523-V849-X-7600, ISBN 3-8009-3849-9) discloses such a switching system to which can be connected analog and digital telephones, telecopiers, multi-functional terminals, workstation systems, personal computers, teletex and picture screen text stations and terminal equipment. The structure of this system is designed such that the connection of traditional apparatus having analog transmission is also possible in addition to digital terminal equipment.

The administration and maintenance software of the known switching system already has program modules that serve the purpose of assuring data consistency. Assuring the database consistency given modification of static data is thereby achieved what are referred to as update program parts and special coordination mechanisms that are comprised in depositing the variable static data in the system composed of function modules (switching unit, peripheral function modules) in parallel in a main memory of the appertaining function module and in backup memories. It is also thereby provided that modified parts of the database are automatically updated at cyclical intervals or are manually updated on the basis of administration and maintenance program modules on a hard disk, whereas the update procedure of standby computers occurs immediately when the active computer is modified (page 101 of the publication). However, assuring the data consistency for a communication system having a plurality of databases is not provided in this publication.

European Patent Application 0 237 841 discloses a method for handling configuration changes in a data processing system and discloses an apparatus for the implementation of this method. The content of a configuration memory and the content of one or more function modules are thereby modified in an invariable sequence of the modification procedures. The function modules each respectively contain a subset of all system configuration data, whereas it is provided for the configuration memory that this contains all system configuration data. As a result of this structure, a relatively large processing outlay can become necessary given data accesses during the course of modification procedures, whereby relatively long processing times can also result.

SUMMARY OF THE INVENTION

In this context, the present invention is based on the problem of assuring the data consistency for a telecommunication switching system of the type initially cited that contains function modules with different demands made of the modification of configuration data. Proceeding on the basis of the prior art, this problem is resolved by the digital telecommunication switching system for interconnecting terminal equipment to the system having: a switching unit; an administration and maintenance function unit connected to the switching unit and into which administration and maintenance jobs are input via an administration and maintenance terminal equipment; at least one peripheral, job-oriented function module; a central system computer in one function unit and decentralized system computers in the other function units; a system administration and maintenance computer program that has program modules for a respectively autonomous processing of the administration and maintenance jobs; a database allocated to the switching unit and at least one further, function-module-associated database, whereby the databases have different hierarchy levels allocated to them such that, given modification of system configuration data sets stored in at least two databases that are to be kept data-consistent system-wide, the respective system configuration data set in the database of the higher-ranking hierarchy level is modified in a first modification step and the system configuration data set in the at least one further function-module-associated database of the lower-ranking hierarchy level is modified in at least a second modification step, comprising: a first table having allocation data that indicates the allocation between the function-module-associated databases and the administration and maintenance program modules that modify system configuration data sets that are to be kept respectively consistent, the system configuration data sets being stored in different function-module-associated databases; function-module-associated, second tables that indicate the administration and maintenance program modules that modify the system configuration data sets in the database allocated to the respective function module and in at least one further, function-module-associated database for assuring data consistency; the first table and the second tables containing an additional, first datum for every administration and maintenance program module, said additional first datum indicating a database of a higher-ranking hierarchy level as compared to at least one database of a subordinate hierarchy level.

The concept provided by the present invention for assuring the data consistency is distinguished by the possibility of providing a plurality of databases of different hierarchy levels, databases of a higher-ranking hierarchy level, i.e. what are referred to as master databases, and databases of a subordinate hierarchy level, i.e. what are referred to as slave databases or dependent databases. In the system of the present invention, none of the databases need contain all system configuration data. Only the data relevant to the function module is fundamentally stored in the databases that are allocated to a respective function module. The memory capacity of the databases is thus more efficiently exploited and the decentralized storing of the data allows faster access by the function modules to the data.

According to another, advantageous embodiment of the present invention, it is provided for every administration and maintenance program module that tables are maintained having a third datum that indicates the number of actual operations of each and every administration and maintenance program module. This measure forms the basis for a system-wide check of the database consistency in what is referred to as a restart case of a function module.

It is inventively provided according to another embodiment that a first table additionally contains an additional, fourth datum (SOLL) for each and every administration and maintenance program module that indicates the number of operations of each and every administration and maintenance program module to be implemented. This operation related information is written into a first table when the administration and maintenance command is input into a terminal equipment. The controller that administers the first table can thus recognize the status of the program module execution at any point in time.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures in which like reference numerals identify like elements, and in which:

FIG. 1 is a schematic illustration of the administration and maintenance hardware and software components of the telecommunication switching system of the present invention;

FIGS. 2a-2e are tables that system computers access in the procedures for assuring the database consistency; and FIGS. 3a-3b depict a flowchart of the administration and maintenance procedures that can be implemented with the telecommunication switching system of FIG. 1.

DESCRIPTION OF THE PREFERRED EMBODIMENT

The telecommunication switching system schematically, shown in FIG. 1 in terms of its administration and maintenance hardware or, respectively, software structure, can be fundamentally constructed similar to the system disclosed in the published European Patent Applications having Serial Nos. 88112249.3, 88112267.5 and 88112263.4, and U.S. Pat. Nos. 4,903,258, 5,047,923 and 5,018,097 (all hereby incorporated by reference).

The software architecture of the known switching system is based on the following criteria:

The first architecture criterion is directed to the three-part division of the switching software into the function complexes of peripheral processing, device handler and call processing. The peripheral processing thereby handles the transport functions and essentially runs on the line/trunk modules for the terminal equipment and lines. The device handler has the function of matching the interface of the peripheral processing to the ISDN interfaces of the call processing. The call processing produces the actual performances for the user surfaces of the terminal equipment or, respectively, for the interfaces to the various connector sets.

The second architecture criterion represents the status or, respectively, event processing in the Call processing oriented with respect to services and terminal equipment. The services criterion is offered as ISDN protocol element of the control software that identifies the device type in service-associated fashion on the basis of the co-supplied device address.

The third architecture criterion for a simple handling of the multitude of terminal equipment and services is strict application of the autonomous database which the programs fundamentally access only on the logical level.

The telecommunication switching system shown in FIG. 1 has four function modules SWU, ADS, VMS and ETB. The function module SWU represents a switching unit that is composed of a switching network (not shown) and a central computer SWU-CC that is preferably formed by a multi-processor controller. The function module ADS is an administration and maintenance unit whose function for the administration and maintenance collaboration with the other function modules of the system shall be set forth later in the specification. Peripheral, job-oriented function modules, for example a function module VMS for the intermediate storage of voice messages as well as a function module ETB with which an electronic telephone book is administered are connectable to the two, afore-mentioned function modules in administration and maintenance terms via an IEC bus. In addition, further peripheral, job-oriented function modules, for example a function module for the automatic distribution of calls (automatic call distribution) can be integrated into the system and can be structured like the function module VMS. Administration and maintenance computer program modules AMC1, AMC2, AMC3 are allocated to the function modules ADS, SWU and VMS. The modules AMC2 and AMC3 that are allocated to the function modules SWU and VMS have the job of controlling the communication of the administration and maintenance commands between the individual function modules and of starting the program modules AMO1, AMO2 and AMO3 or, respectively, AMO4. To this end, these program modules are loaded from the corresponding memories HD1 or, respectively, HD3 into intermediate memories (not shown) that are individually associated to the function modules. Further, the modules AMC have the job of administering the second table SAT (Service AMO Table) that is yet to be set forth. In the illustrated exemplary embodiment, the module AMC1 only has the job of command forwarding and the module AMC4 that is allocated to the function module ETB only has the job of administering the second table SAT3.

Three program modules AMO1, AMO2 and AMO3 that are referenced SCSU, SBCSU and PERSI in the table SEATS (Surveillance Entry AMO Table) shown in FIGS. 2a and 2b are allocated to the function module SWU. These three program modules modify system data configuration sets that are stored in the database SWU-DB and that, as the table SEAT likewise shows, are deposited in the database VMS-DB. The database SWU-DB is what is referred to as the master database for AMO1 (equals SCSU), AMO2 (equals SBCSU) and AMO3 (equals PERSI), i.e. a database of a higher-ranking hierarchy level, whereas the database VMS-DB for AMO1, AMO2 and AMO3 is what is referred to as a dependent or slave database, i.e. a database of a lower hierarchy level. VMS-DB is the master database for AMO4; the appertaining, dependent database is not shown.

The database of the function module ETB does not have the status of a master database with respect to any system configuration data sets, so that no program module AMO is allocated to the function module ETB, either.

The function modules SWU, VMS, ETB each have an afore-mentioned, autonomous database SWU-DB, VMS-DB and ETB-DB available to them. It is assumed that at least a part of the data sets of system configuration data is stored in more than one of the said databases. Further description refers to these data sets, insofar as other properties of the datasets are not cited. For assuring the data consistency required for a proper system operation, data sets, for example the telephone number and name of a subscriber, must be modified in every affected database (see the AMO "PERSI" in FIGS. 2a–2e that serves the purpose of personal identification). For assuring the data sets and tables (SEAT, SAT1 . . . SATx) deposited in the databases, a known "backup" function and backup memories HD1, HD2, HD3 (hard disk HD) are, among other things, respectively provided.

The administration and maintenance unit ADS can be connected to an administration and maintenance terminal equipment ADS-T. This serves the purpose of inputting administration and maintenance commands AMO-CMD. The administration and maintenance terminal equipment ADS-T is in communication with a unit MMI (man-machine interpreter) that is formed by a text processor program module that serves the purpose of converting command information (for example according to the CCITT Man-Machine language) into application-suited data information. Further sub-jobs of the text processor program module MMI are the syntax check, the analysis of commands corresponding to parameter tree definition parsing, the implementation of individual parameter checks vis-a-vis application-related data tables and the editing of output texts.

Every command that can be input into the terminal equipment ADS-T or into a potentially further terminal equipment ETB-T is composed of three parts: of a designation of the administration and maintenance job AMO1, AMO2, AMO3 or AMO4, of a designation of the action to be undertaken such as, for example, "modifying", "erasing", "interrogating", and of parameter data such as, for example, a subscriber telephone number that specify the respective administration and maintenance job and the action. Commands that are restricted to an interrogation and do not lead to a modification of system configuration data sets shall not be considered here.

The unit MMI is in communication with a unit KI that is in turn connected to the backup memory HD1 and to the IEC bus that connects the function modules. A unit KI that carries out the actual job of preserving the data consistency of all system databases is active in the controller ADS-CPU, whereby it uses the table SEAT.

Among other things, system configuration data sets that must be held consistent system-wide are stored in the databases of the system. For example, a telephone number 123 and the appertaining name "Mr. X" of a subscriber is thus stored both in the database SWU-DB as well as in the database ETB-TB. When the appertaining name or, respectively, the allocation of telephone number and name changes, then the corresponding data set in the two, afore-mentioned databases must be modified in the same way.

The system shown in FIG. 1 is equipped such that two administration and maintenance terminal equipment ADS-T and ETB-T can be connected to the administration and maintenance unit ADS or, respectively, to the peripheral function module ETB. Administration and maintenance jobs that are implemented upon employment of the program module AMO allocated to the respective function module can be input into these terminal equipment.

The telecommunication switching system shown in FIG. 1 has a plurality of system computers, whereby the switching unit SWU has a central system computer SWU-CC allocated to it and the function modules ADS, VMS and ETB have one or more decentralized computers ADS-CPU, VMS-CPU, ETB-CPU allocated to them. However, a telecommunication switching system of the present invention can also have only one computer that then fulfills all administration and maintenance jobs occuring in the system and is thus computer-independent.

The unit K1 has a table SEAT (Surveillance Entity AMO Table) that indicates the allocation of all program modules (AMO1, . . . ,AMOn) present in the system to the respective function-module-associated databases SWU-DB, VMS-DB and ETB-DB.

Examples of such a table SEAT are shown in FIGS. 2a and 2b. The first column lists program modules AMO, whereas allocation data are recited in the blocks respectively composed of three or, respectively, four columns that are each respectively allocated to a function module database SWU-DB, VMS-DB, ETB-DB. In the illustrated example, the program modules AMO are referenced SCSU, SBCSU and PERSI. The program module SCSU (subscriber configuration switching unit) serves the purpose of the memory entries that are necessary for the subscriber configuration; the program module SBCSU (subscriber bus configuration unit) serves the purpose of the memory entries that are necessary for the configuration of subscribers at the So bus; and the program module PERSI (personal identification) serves the purpose of the memory entries of person-related data (for example name of a subscriber). The further program module ABC listed in the table SEAT is a program module that, for example, serves the purpose of configuring voice mailboxes.

The function modules SWU, VMS and ETB have individual databases SWU-DB, VMS-DB and ETB-DB allocated to them that differ in terms of their hierarchy. As shall be set forth later, what is referred to as a master database and at least one hierarchically subordinate, dependent database are provided for every program module AMO.

The symbol "x" denotes that the respective program module AMO or, respectively, a system configuration data set to be modified by the appertaining program module is allocated to the respective function-module-associated database. The information "M" that can occur in the second block column indicates that the database of the respective function module is what is referred to as the master database for the appertaining program module or, respectively, the appertaining system configuration data set. The information "M" must appear exactly once per row in the table SEAT.

Master database indicates that database that is involved in a first modification step given modification of a system configuration data set, whereas further databases of function modules that represent a dependent database for the system configuration data set to be modified by the appertaining program module AMO due to the lack of an information "M" in the table illustrated in FIG. 2a are only involved in the modification process in a second or a following modification step when handling administration and maintenance jobs.

The respectively third column in a block contains an additionally, third datum "ACTUAL" (IST) that indicates the number actual operations of the appertaining program module AMO (as used herein the number of operations refers to the number of actual runs in the sense of executions or processings of the appertaining program module).

For example, the operation numerical information 108 is allocated to the program module AMO or, respectively, to the appertaining system configuration data set SCSU, namely for the databases of the function module SWU and of the peripheral function module ETB. By contrast, the program module PERSI has the operation numerical information 367 for the function module database SWU-DB, whereas the corresponding version information for the peripheral function modules VMS and ETB reads 366.

These different operation number information indicate that the system configuration data set related to the program module PERSI is to be modified in the databases of the function modules VMS and ETB. The system configuration data set PERSI is not data-consistent system-wide at the point in time shown in the table SEAT.

As the entries "M" in FIG. 2a show, the database SWU-DB is the master database for the system configuration data sets related to the program modules SCSU, SBCSU and PERSI, whereas the databases of the remaining function modules VMS-DB and ETB-DB are dependent databases for the three, afore-mentioned system configuration data sets. The databases of the function module VMS is the master database for the system configuration data set related to the program module ABC.

The table SEAT shown in FIG. 2b contains a fourth block column for every database that contains a fourth datum "SCHEDULED" (SOLL) for every administration and maintenance program module AMO that indicates the scheduled number of operations of each and every program module to be implemented.

The tables SAT1, SAT2 and SAT3 shown in FIGS. 2c, 2d and 2e are allocated to the databases SWU-DB, VMS-DB and ETB-DB. These tables indicate what program modules AMO modify system configuration data sets in the database of the appertaining function module and in the data sets in the master database (SWU-DB in the present case). The program modules SCSU, SBCSU and PERSI are allocated to the peripheral function module SWU. These information are supplemented by an operation numerical information that indicates the number of modifications in the respective, function-associated database.

The table shown in FIG. 2d that is allocated to the database VMS-DB is supplemented by an information "M" in the third column in addition to the operation numerical information in the second column, this information "M" indicating that the database VMS-DB of the function module VMS is the master database for the program module ABC listed in the first row or, respectively, for the appertaining system configuration data set. When a corresponding entry "M" is lacking in the tables SAT1 ... SATx, then the database SWU-DB is the master database for the appertaining program module (SCSU, SBCSU, PERSI).

The second tables SAT1 ... SAT3 are derived in program-oriented terms from the system configuration data sets stored in the respective databases SWU-DB, VMS-DB and ETB-DB and are respectively deposited on the appertaining backup memories HD1, HD2 and HD3. At every runup of the function modules SWU, VMS and ETB the content of the tables SATx is communicated to the unit KI that forms the table SEAT from the communicated information.

The table SEAT shown in FIG. 2b shows coinciding scheduled and actual operation numerical information for the data sets related to the program modules ABC and SCSU, so that one must proceed on the basis of the data consistency of the configuration data sets stored in the corresponding databases.

It may be derived from the table SEAT in FIG. 2 for the configuration data set to be modified by the program module SBCSU that the master database SWU-DB has been informed of the data set modification to be executed on the basis of the command input into an administration and data terminal equipment (ADS-T, ETB-T) (scheduled operation numerical information=25). The modification of the data set, however, has not (yet) been implemented in the master database SWU-DB (actual operation numerical information=24). The modification to be implemented has not been communicated to the dependent database ETB-DB and the modification has not been carried out (scheduled and actual operation numerical information are both 24).

It may be derived from the table SEAT in FIG. 2 for the configuration data set to be modified by the program module PERSI that the modification to be implemented has been implemented in the master database PERSI. The first dependent database ETB-DB has been informed of the modification to be carried out; the modification, however, has not been implemented. The second dependent database VMS-DB has not been informed of the modification to be carried out and the modification has not been implemented.

The processing of an administration and maintenance request shall be set forth below with reference to the flowchart shown in FIG. 3.

An administration and maintenance command AMO1-CMD is input into the administration and maintenance terminal equipment ADS-T of the unit ADS, this command, as already set forth above, being composed of three component parts and being intended to lead to the modification or erase of a system configuration data set. The request is supplied to the unit MMI that, in a known way, converts the input signals into application-suited data information. The controller ADS-CPU of the administration and maintenance unit ADS accesses the unit KI and, on the basis of the table SEAT deposited there, identifies whether, in the administration and maintenance job AMO indicated in the command and the action that is likewise indicated it effects a modification of the master database for which other function modules have communicated an interest in the data via their tables SAT.

When, in the examples shown in FIG. 2a or 2b, a command is input that relates to one of the four recited program modules ABC, SCSU, SBCSU and PERSI, then the check leads to a positive result. The master database VMS-DB (for ABC) or, respectively, the master database SWU-DB (for SCSU, SBSCU and PERSI) is thus to be modified.

It is now assumed that the database SWU-DB of the switching unit is to be modified by the recited, administration and maintenance job. The scheduled operation numerical information is first incremented by +1 in the table SEAT for the master database SWU-DB. The command is now supplied via the IEC bus to the function module SWU and is processed there with the corresponding AMO. As a result, the modified system configuration data set is written into the database SWU-DB. The respective program module AMO acknowledges the proper handling of the corresponding administration and maintenance job AMO and supplies this acknowledgement to the unit KI and to the input terminal ADS-T via the IEC bus. The unit increments the corresponding operation numerical information "1st" "ACTUAL" by +1. Following thereupon the table SEAT is interrogated to see whether the corresponding system configuration data set is to be modified in another, i.e. in a dependent database of the system.

This is the case here for the database VMS-DB. The corresponding command AMO-CMD is supplied unmodified via the IEC bus to the function module VMS and is processed therein in an analogous way. After a successful conclusion of this second modification step, the operation numerical information in the table SAT of the function module ETB is likewise incremented by +1. The controller VMS-CPU likewise forms an acknowledgment signal and conducts this via the ICB bus to the unit K1 wherein the table SEAT is updated with respect to the operation numerical information.

Administration and maintenance jobs can also be input into the terminal equipment ETB-T. When this job, for example, effects the program module or, respectively, a system configuration data set PERSI, then this job is supplied via the IEC bus to the unit MM1 and K1. The further processing ensues as was set forth with reference to the flowchart. As FIGS. 2a through 2e show, the database of the function module SWU is the master database for the program module PERSI, so that the first modification step is implemented with respect to the data set stored in the database SWU-DB, whereby the databases of the function modules VMS and ETB are updated in a second or, respectively, third modification step.

It follows from the above description that the second tables SATx are derived in program-oriented terms from the system configuration data sets stored in the appertaining databases. At every runup of the appertaining function modules, the content of these tables SATx is communicated to a unit K1 that forms the table SEAT from the communicated information. Upon input of an administration and maintenance command, a SCHEDULE (SOLL) operation numerical information can first be incremented by +1 in the table SEAT for the system configuration data set that is related to the administration and maintenance job AMO recited in the command. As a result, the system configuration data set stored in the master database is modified, this triggering the formation of an acknowledgement signal. The latter is supplied to the unit KI that increments the corresponding ACTUAL operation numerical information by +1. As a result, the corresponding, dependent database or, respectively, the corresponding operation numerical information is treated in the same way.

After the modification of the system configuration dataset in the master database, the administration and maintenance command is communicated unmodified to the dependent database or databases. The respective dependent database thereby only extracts a respective data subset of interest from the parameter data contained in the administration and maintenance command.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What is claimed is:

1. A digital telecommunication system having:
   a switching unit;
   an administration and maintenance unit connected to the switching unit and into which administration and maintenance jobs are input via an administration and maintenance terminal equipment;
   at least one peripheral job-oriented function unit;
   a central system computer in the switching unit and decentralized system computers in the administration and maintenance unit and in the at least one peripheral job-oriented function unit;
   means for providing a system administration and maintenance computer program that has program modules for a respectively autonomous processing of the administration and maintenance jobs;
   a plurality of database means respectively allocated to the switching unit and to the at least one peripheral job-oriented function unit whereby the plurality of data base means have different hierarchy levels such that for modification of system configuration data sets that are stored in at least two of the plurality of database means and that are to be kept data-consistent system-wide, the respective system configuration data set in a first database means of the at least two database means having a higher-ranking hierarchy level is modified in a first modification step and the system configuration data set in a second database means of the at least two database means having a next lower-ranking hierarchy level is modified in a second modification step, comprising:
   a first table means having allocation data that indicates allocation between the plurality of database means and program modules that cause the central system computer to modify system configuration data sets that are stored in at least one of the database means, wherein the system configuration data sets are kept respectively consistent;
   a plurality of second table means respectively allocated to the switching unit and the at least one peripheral job-oriented function unit, said plurality of second table means indicating the program modules that modify the system configuration data sets that are stored in one database means of the plurality of database means and that are stored in at least one further database means of the plurality of database means for assuring data consistency; and
   the first table means and the plurality of second table means each containing an additional first datum for every program module, said additional first datum indicating a database means of a higher-ranking hierarchy level as compared to at least one database means of a subordinate hierarchy level.

2. The digital telecommunication switching system according to claim 1, wherein the first table means and the plurality of second table means each contain an additional, first further datum for every program module, said additional, first further datum indicating the number of actual executions of every program module regarding at least one database means of the plurality of database means.

3. The digital telecommunication switching system according to claim 2, wherein the first table means contains an additional, second further datum for every program module, said additional, second further datum indicating the scheduled number of executions of each program module to be implemented regarding at least one database means of the plurality of database means.

4. The digital telecommunication switching system according to claim 1, wherein the system further comprises means for writing the content of a designated second table means of the plurality of second table means into the first table means for the designated second table upon execution of at least one of the switching unit and the at least one peripheral job-oriented function unit so that the first table means is thereby updated.

5. A digital telecommunication system having:
a switching unit;
an administration and maintenance unit connected to the switching unit and into which administration and maintenance jobs are input via an administration and maintenance terminal equipment;
at least one peripheral job-oriented function unit;
a central system computer in the switching unit and decentralized system computers in the administration and maintenance unit and in the at least one peripheral job-oriented function unit;
means for providing a system administration and maintenance computer program that has program modules for a respectively autonomous processing of the administration and maintenance jobs;
a plurality of database means respectively allocated to the switching unit and to the at least one peripheral job-oriented function unit whereby the plurality of database means have different hierarchy levels such that for modification of system configuration data sets that are stored in at least two of the plurality of database means and that are to be kept data-consistent system-wide, the respective system configuration data set in a first database means of the at least two database means having a higher-ranking hierarchy level is modified in a first modification step and the system configuration data set in a second database means of the at least two database means having a next lower-ranking hierarchy level is modified in a second modification step, comprising:
a first table means having allocation data that indicates allocation between the plurality of database means and program modules that cause the central system computer to modify system configuration data sets that are stored in at least one of the database means, wherein the system configuration data sets are kept respectively consistent;
a plurality of second table means respectively allocated to the switching unit and the at least one peripheral job-oriented function unit, said plurality of second table means indicating the program modules that modify the system configuration data sets that are stored in one database means of the plurality of database means and that are stored in at least one further database means of the plurality of database means for assuring data consistency;
each of the first table means and the plurality of second table means containing a first datum for every program module, said first datum indicating hierarchy levels of database means;
each of the first table means and the plurality of database means further containing an actual operation datum for every program module, said actual operation datum indicating the number of actual executions of a respective program module regarding at least one database means of the plurality of database means; and
the first table means containing a scheduled operation datum for every program module, said scheduled operation datum indicating the number of executions of each program module to be implemented regarding at least one database means of the plurality of database means.

6. The digital telecommunication switching system according to claim 1, wherein the system further comprises means for writing the content of a designated second table means so that the first table means is thereby updated into the first table means for the designated second table means upon execution of at least one of the switching unit and the at least one peripheral job-oriented function unit so that the first table means is thereby updated.

7. A digital telecommunication system having:
a switching unit;
an administration and maintenance unit connected to the switching unit and into which administration and maintenance jobs are input via an administration and maintenance terminal equipment;
at least one peripheral job-oriented function unit;
a central system computer in the switching unit and decentralized system computers in the administration and maintenance unit and in the at least one peripheral job-oriented function unit;
means for providing a system administration and maintenance computer program that has program modules for a respectively autonomous processing of the administration and maintenance jobs;
a plurality of database means respectively allocated to the switching unit and to the at least one peripheral job-oriented function unit whereby the plurality of database means have different hierarchy levels such that for modification of system configuration data sets that are stored in at least two of the plurality of database means and that are to be kept data-consistent system-wide, the respective system configuration data set in a first database means of the at least two database means having a higher-ranking hierarchy level is modified in a first modification step and the system configuration data set in a second database means of the at least two database means having a next lower-ranking hierarchy level is modified in a second modification step, comprising,
a first table means having allocation data that indicates allocation between the plurality of database means and program modules that cause the central system computer to modify system configuration data sets that are stored in at least one of the database means, wherein the system configuration data sets are kept respectively consistent;
a plurality of second table means respectively allocated to the switching unit and the at least one peripheral job-oriented function unit, said plurality of second table means indicating the program modules that modify the system configuration data sets that are stored in one database means of the plurality of database means and that are stored in at least one further database means of the plurality of database means for assuring data consistency;
each of the first table means and the plurality of second table means containing a first datum for every program module, said first datum indicating hierarchy levels of database means;

each of the first table means and the plurality of database means further containing an actual operation datum for every program module, said actual operation datum indicating the number of actual executions of a respective program module regarding at least one database means of the plurality of database means;

the first table means containing a scheduled operation datum for every program module, said scheduled operation datum indicating the number of executions of each program module to be implemented regarding at least one database means of the plurality of database means; and means for writing the content of a designated second table means into the first table means for the designated second table means so that the first table means is thereby updated upon execution of at least one of the switching unit and the at least one peripheral job-oriented function unit.

* * * * *